Patented Apr. 8, 1930

1,753,398

UNITED STATES PATENT OFFICE

CHARLES E. F. AHLM, OF CLEVELAND, AND GEORGE M. SOULE, OF SOUTH EUCLID, OHIO, ASSIGNORS TO AUTOMOTIVE PATENT HOLDING COMPANY, OF CLEVELAND, OHIO, A CORPORATION OF DELAWARE

TRANSMISSION GEARING

Application filed January 8, 1925. Serial No. 1,326.

This invention relates to automobile transmission mechanism and is particularly adapted for use with already existing transmission on certain types of cars. We have shown an embodiment of our invention which is capable of transmitting either direct drive through the agency of a dental clutch or of transmitting a reduced or increased speed to a driven member through an internal gear of slightly larger pitch diameter than a driving or driven pinion with which it may engage. Other speed relations may be used effectively within the scope of our invention.

It is an object to provide a novel gearing arrangement of the class shown wherein one of the gears has a supporting shaft extending freely from its bearing, and projecting the least distance therefrom when the external gear engages the internal gear. Further it is an object to so arrange an internal gear and clutch relative to a pinion carrying member, having a bearing support, that the pinion may be at least partially supported in one of its driving positions by its engagement with the teeth of the clutch, while in its other position it may be moved close to the bearing for better support by such bearing. A further object is to provide a simple effective bearing construction for a shaft which will permit such a shaft to move therein without likelihood of side-play or vibration.

In carrying out our invention, we employ a driving member capable of movement in two directions, that is to say longitudinally of the transmission to cause a parallel relative movement between a pinion and internal gears to engage or disengage one with the other and bodily in a lateral direction for moving the pinion to engage other gears or a clutch to accomplish speed changes. An object is to arrange the elements of this mechanism in such a manner that the mechanism will be efficient in its operation, and capable of being easily and cheaply manufactured and assembled. A further object is to provide for effectively sealing the casing, wherein the mechanism operates against the escape of lubricating oil. Another specific object is the provision of a two part eccentric bearing member, each part of which may serve to support a substantial roller bearing for an internally splined driving member and to provide for mounting a shifting lever in a spherical aperture between the two parts of the bearing members for shifting a pinion carrying shaft within the tubular driving member.

Other objects and features of our invention will become apparent in the further description which pertains to the accompanying drawings. The essential novel characteristics will be summarized in the claims.

Figure 1:
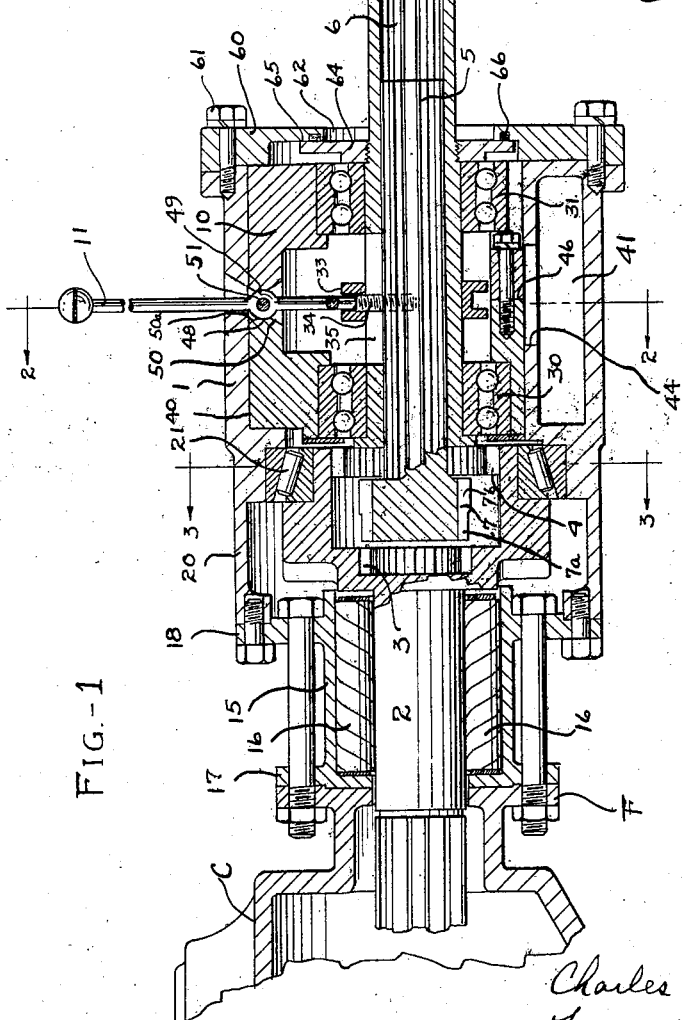
Figure 2:
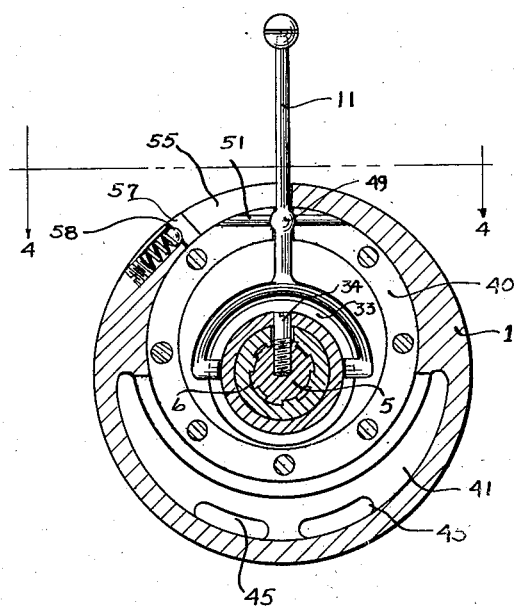
Figure 3:
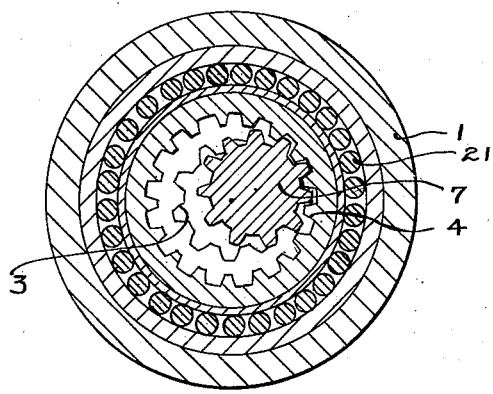

In the drawings, Fig. 1 is a substantially central longitudinal cross-section through our transmission; Fig. 2 is a transverse cross-section taken along the lines 2—2 of Fig. 1; Fig. 3 is a similar cross-section taken along the lines 3—3 of Fig. 2; Fig. 4 is a sectional plan as indicated by the lines 4—4 on Fig. 2 showing a portion of the gear shifting mechanism.

Our invention includes a casing 1, preferably formed in three parts as shown and in which is supported a driving member or shaft 2, rigidly carrying a dental clutch 3, and an internal gear 4. A driven shaft 5 is shown as splined within a tubular driven member 6, and carries a pinion having externally formed teeth 7. The shaft 5 is capable of being moved longitudinally and transversally so that the pinion may engage either the clutch or the gear. The mechanism employed for imparting this movement to the pinion carrying shaft includes an eccentric bearing member 10 having its axis of rotation off-set from that of the shaft 5 so that a rotating movement of the eccentric in one direction will move the teeth of the pinion into alignment with a portion of the teeth of the gear 4 and on opposite rotation, into alignment with the clutch. The same lever indicated at 11 that is used to accomplish this rotating movement of the eccentric also serves as a shifting member for the pinion whereby it may be slid either forwardly or rearwardly to engage the clutch or gear respectively.

The foremost portion of the casing indicated at 15 is preferably tubular in form for supporting a roller bearing 16 of substantial length which carries the driving shaft 2. This casing member is provided with flanges at either end at 17 and 18 respectively, the former being adapted to engage a similar flange F on an already existing transmission casing C and it is to be understood that this flange 17 may take any form to best serve this purpose. Within the main casing 20, we preferably provide combination radial and thrust roller bearings 21 to better support the gear carrying extension of the shaft 2. It is to be noted that the gear 4 and the clutch 3 are separated longitudinally by a distance slightly greater than the overall length of the pinion teeth 7, and that the pinion has its neutral position between the clutch and the gear. When the pinion is shifted forwardly into engagement with the clutch, separate engaging faces as at 7$^a$ and 7$^b$ are provided on the pinion for engaging the clutch and gear. It is to be understood that each tooth of the pinion engages a complementary tooth on the clutch by reason of being formed on equal pitch diameters; so that in its forwardly extended position relative to its bearing, the pinion shaft is adequately supported to prevent side play likely to cause wear which would ultimately result in a noisy gearing. When the engaging zone 7$^b$ of the pinion 7 is withdrawn into mesh with the gear 4, the rear end of the pinion is in abutting relation to the forward end of the driving sleeve 6 and the result of this arrangement is that the pinion shaft is well supported against side play or vibration in either its extended or retracted position.

To most effectively support the pinion shaft and to provide for bodily moving the pinion into gear or clutch engaging position, we preferably support the driving sleeve 6 in radial roller bearings 30 and 31 which for the sake of longitudinal compactness of the transmission in general, we have shown as spaced apart a distance corresponding to the total movement of the pinion necessary to engage the gearing and clutch. We have found this to be a very good bearing arrangement which also affords a space for a preferred form of shifting mechanism comprising a grooved shifting collar 33 loosely fitting the sleeve 6 and which may have one or more inwardly projecting screws 34 extending through elongated slots 35 and entering the splined shaft 5.

The eccentric bearing 10 is adapted to turn freely within a circular opening 40 in the casing 20 which opening is preferably above a separated oil chamber 41. The oil chamber communicates with the eccentric through the elongated radial aperture 44 and with the bearing for the gear through longitudinal openings 45 as shown in Fig. 2. The bearing is shown as separated at 46 and each of its abutting faces has a spherical depression 48 and 49. Cut away cylindrical portions 50 on each face are, when the bearing is assembled, adapted to receive a pivot pin 51 for the shipper lever 11. The lever at the fulcrum point is in the form of a ball which closes the spherical opening in the bearing formed by the depressions while the forward and rearward swing of the lever is permitted by the cut-away portions of the bearing as at 50 and 50$^a$. The lateral bodily movement of the upper arm of the lever for changing the transverse relation of the pinion and gear or clutch is permitted by a peripheral slot 55 through the casing 20 as shown in Fig. 4. At either end of this slot and facing in opposite directions, we preferably provide entrance slot for the lever at 56 and 57 to guide the lever and lock it in its shifted position. Spring pressed balls such as indicated at 58 and 59 or any known expedient may serve to hold the lever in the entrance slots against inadvertant dislocation.

The eccentric bearing is held in place by a rear end plate 60 shown as secured to the housing member 20 as by screws 61 and as having an opening 62 sufficiently large to permit the bodily movement of the driving sleeve 6. To effectively close this aperture and to provide a locking nut for preventing longitudinal movement of the sleeve, we provide a flanged threaded plate 64 capable of a sliding seal against the inner surface 65 of the member 60, escape of oil at this point being prevented by an annular groove 66 which may be filled with fibrous material.

Having thus described our invention, we claim:

1. In a transmission gearing in combination, a pair of rotatable members, one adapted to drive the other, a dental clutch and an internal gear carried by one of the members, a pinion carried by the other member, a splined sleeve carrying one of said rotatable members, a rolling bearing for the sleeve, an eccentric shell supporting said bearing and means extending within said eccentric shell comprising a pivoted lever for moving the eccentric to align the teeth of the pinion with the teeth of the clutch or gear and to subsequently cause the pinion to engage the clutch or gear.

2. In combination a driving member having a dental clutch and an internal gear carried rigidly therewith, a shiftable driven member having a pinion adapted to engage either the clutch or gear, a splined sleeve supporting said pinion carrying member, an eccentric bearing for the sleeve adapted to be rotated through a predetermined arc to cause the alignment of the teeth of the pinion with either the clutch or gear, and means including a shifting collar exteriorly of the sleeve, an opening in the sleeve and a pin extending therethrough for connecting the driven shaft with the collar and a lever cooperating with the collar and having its fulcrum in the eccentric member, for rotating the bearing and for subsequently shifting the pinion carrying member.

3. In combination, a driving and a driven member one member having in internal gear and clutch, the other member having a pinion adapted to selectively engage either the clutch or gear, an eccentric bearing for one of said members formed of two transversally joined parts, adapted to be rotated to align the pinion with either the gear or clutch, a splined sleeve within the eccentric bearing for supporting the member, rolling bearings at either end of the eccentric bearing member for supporting the sleeve, a shifting member carried exteriorly of the sleeve between the bearings, and rigid with the pinion carrying member for causing the pinion to engage the gears, and a shifting lever cooperating therewith having a fulcrum comprising a spherical member supported by a recess formed between the abutting faces of the eccentric bearing.

4. In combination, in a transmission gearing, a rotatable member having an internal clutch and gear, said clutch and gear being separated longitudinally, another rotatable member having a pinion adapted to mesh with either the clutch or gear, said pinion having a length less than the longitudinal distance between the clutch and gear, a bodily movable member, a splined sleeve extending therethrough, rolling bearings carried by the bodily movable member adapted to support the splined member, and a pivoted lever extending within said bodily movable member and having a connection with the pinion shaft for causing first the lateral movement of the pinion shaft to align the pinion with the gear or clutch and subsequently to effect the longitudinal shifting for causing it to drivingly engage therewith.

5. In a gearing, a rotatable member having a plurality of internally toothed members of different pitch diameters, another rotatable member having an externally toothed member arranged to engage selectively therewith, a drum comprising separate members eccentrically mounted with reference to one of the rotatable members and carrying the same, and a member pivoted substantially at the line of separation of said separable members and having a connection with said last named rotatable member to effect relative longitudinal shifting between the toothed members for causing their engagement.

6. In a gearing, a pair of rotatable members to be connected, a plurality of internally toothed members carried by one of said rotatable members, an externally toothed member carried by the other and arranged to engage selectively with said internally toothed member, an eccentric bearing member for one of the rotatable members arranged to be moved to cause the toothed members of the respective rotatable members to drivingly align, an operating member extending into the eccentric member, and having a connection with the rotatable member supported thereby for causing longitudinal relative movement between the toothed members to cause the aligned members to engage, a casing for the bearing member, and means including guideways in the casing for determining the path of movement of the operating member.

In testimony we hereunto affix our signatures.

CHARLES E. F. AHLM.
GEORGE M. SOULE.